United States Patent [19]
Frankiewicz et al.

[11] Patent Number: 6,117,333
[45] Date of Patent: Sep. 12, 2000

[54] REMOVAL OF HYDROCARBONS, MERCURY AND ARSENIC FROM OIL-FIELD PRODUCED WATER

[75] Inventors: Theodore C. Frankiewicz, Sugar Land, Tex.; John Gerlach, Las Vegas, Nev.

[73] Assignee: Union Oil Company of California, El Segundo, Calif.

[21] Appl. No.: 08/841,481

[22] Filed: Apr. 22, 1997

[51] Int. Cl.[7] .................................................. C02F 1/58
[52] U.S. Cl. .......................... 210/705; 210/708; 210/709; 210/725; 210/727; 210/911; 210/914; 423/87; 423/101
[58] Field of Search .................................. 210/705, 709, 210/721, 724, 725, 726, 727, 787, 911, 914, 708; 423/101, 87

[56] References Cited

U.S. PATENT DOCUMENTS

| | | | |
|---|---|---|---|
| 3,707,464 | 12/1972 | Burns et al. | 210/705 |
| 4,196,064 | 4/1980 | Harms et al. | 204/147 |
| 4,278,539 | 7/1981 | Santhanam et al. | 210/724 |
| 4,503,017 | 3/1985 | Gadd et al. | 423/87 |
| 4,532,114 | 7/1985 | Spevack | 423/210 |
| 4,566,975 | 1/1986 | Allgulin | 210/711 |
| 4,724,084 | 2/1988 | Pahmeier et al. | 210/709 |
| 4,911,825 | 3/1990 | Roussel et al. | 208/251 |
| 5,024,769 | 6/1991 | Gallup | 210/721 |
| 5,037,558 | 8/1991 | Kalnins | 210/787 |
| 5,045,214 | 9/1991 | Walker | 210/717 |
| 5,080,799 | 1/1992 | Yan | 210/661 |
| 5,093,007 | 3/1992 | Domvile | 210/713 |
| 5,096,682 | 3/1992 | Tooley et al. | 423/245.1 |
| 5,266,210 | 11/1993 | McLaughlin | 210/710 |
| 5,348,662 | 9/1994 | Yen et al. | 210/717 |
| 5,358,643 | 10/1994 | McClintock | 210/709 |
| 5,368,703 | 11/1994 | Brewster | 204/86 |
| 5,370,849 | 12/1994 | Chang | 423/239.1 |
| 5,380,443 | 1/1995 | Deininger et al. | 210/724 |
| 5,384,040 | 1/1995 | Mank et al. | 208/251 R |
| 5,401,392 | 3/1995 | Courty et al. | 208/251 H |
| 5,421,994 | 6/1995 | Sarrazin et al. | 208/251 R |
| 5,558,775 | 9/1996 | Busch | 210/638 |
| 5,643,460 | 7/1997 | Marble et al. | 210/705 |
| 5,651,895 | 7/1997 | Gordon | 210/709 |

FOREIGN PATENT DOCUMENTS

| | | |
|---|---|---|
| 1334193 | 1/1995 | Canada . |
| 2138562 | 6/1995 | Canada . |
| 0621241 | 10/1994 | European Pat. Off. . |
| 4223618 | 4/1993 | Germany . |
| 50-85571 | 7/1975 | Japan ................................ 210/914 |
| 55-94679 | 7/1980 | Japan ................................ 210/911 |
| 2206342 | 1/1989 | United Kingdom . |
| WO9415710 | 7/1994 | WIPO . |

*Primary Examiner*—Peter A. Hruskoci
*Attorney, Agent, or Firm*—Yale S. Finkle; Gregory F. Wirzbicki; Alan H. Thompson

[57] ABSTRACT

A process is disclosed which involves removing hydrocarbons, arsenic and mercury from wastewater produced in oil and gas fields. An oxidant, ferric ions, and flocculent are sequentially added to the wastewater to form a removable sludge containing the arsenic, hydrocarbon, and mercury contaminants. The Oxidation-Reduction Potential of the wastewater is controlled by oxidant addition to allow the required arsenic oxidation to occur while maintaining the mercury in elemental form. The process requires relatively short residence times between chemical additions and provides for large wastewater throughputs. The cleaned wastewater is suitable for discharge to the environment.

59 Claims, 2 Drawing Sheets

6,117,333

REMOVAL OF HYDROCARBONS, MERCURY AND ARSENIC FROM OIL-FIELD PRODUCED WATER

FIELD OF THE INVENTION

The invention relates to a process for reducing contaminants in wastewater such as water produced during the oil field production of hydrocarbon materials including petroleum oils, natural gas and condensate.

BACKGROUND

Water is often co-produced along with the production of petroleum oils, natural gas and condensate. In the case of off-shore production, such produced water, i.e., wastewater, is generally discharged to the body of natural water surrounding the producing platform structure. The wastewater may contain relatively high levels of environmentally contaminating materials that make the water unacceptable for discharge. Such materials include mercury and arsenic, along with varying concentrations of dissolved and dispersed hydrocarbons. The contaminant materials can be found in the water in the elemental or ionic forms. The dispersed hydrocarbons can be present as fine droplets contained in water in the form of an emulsion, i.e., emulsified hydrocarbons, or in the form of undissolved, yet non-emulsified hydrocarbons. Recent governmental regulations of such contaminating materials in the discharged wastewater set permissible concentrations and seek to reduce the contaminant levels to those that are environmentally innocuous. If the concentration of a contaminating material in the wastewater exceeds that specified in the regulations, the concentration of that contaminant must be reduced prior to discharge.

Accordingly, wastewater treatment processes are being developed to reduce the amount of contaminants in the wastewater to acceptable discharge levels, particularly processes feasible for use on off-shore hydrocarbon production platforms.

SUMMARY OF THE INVENTION

The present invention relates to a process for reducing the concentrations of contaminants such as hydrocarbons (emulsified or non-emulsified), mercury (primarily elemental) and arsenic components from wastewater, such as that co-produced during the production of petroleum oils, natural gas, condensate and other hydrocarbon-containing materials from oil fields. More particularly, the process of the invention results in a cleaned wastewater stream having relatively low contaminant weight levels, e.g., less than about 10 parts per billion (ppbw) of mercury (calculated as Hg), less than about 250 ppb and preferably less than 100 ppb of arsenic (calculated as As), and less than about 40 parts per million (ppmw) of total petroleam hydrocarbons (TPH) as defined by the EPA analytical method 413.1 (Freon extraction, infrared detection).

In the process of the invention, non-emulsified hydrocarbon droplets, emulsified hydrocarbon droplets, elemental mercury, arsenic and dissolved hydrocarbons are expeditiously removed from large throughputs of wastewater streams. If present, relatively large, non-emulsified hydrocarbon-containing droplets (i.e., minimum cross-sectional diameters above about 25 microns) are initially separated from the wastewater to form a pre-treated wastewater containing primarily emulsified hydrocarbons, and mercury and arsenic contaminants, but generally depleted of non-emulsified hydrocarbons.

Suitable water clarifiers may be added to the pre-treated wastewater stream to destabilize residual, emulsified hydrocarbon droplets. Such water clarifiers also act to enhance the attraction of the wastewater contaminants, such as elemental mercury-containing particulates, with the destabilized, emulsified hydrocarbon droplets for convenient separation from the water, i.e., the hydrophobicity of the elemental mercury-containing entities is maintained or enhanced. A substantial proportion of the destabilized, emulsified hydrocarbon droplets and hydrophobic elemental mercury-containing entities can then be separated from the pre-treated wastewater, with, if necessary, the aid of a sludge-contracting material, such as a polymer-containing flocculent. A resulting, partially-cleaned wastewater stream, containing arsenic, remaining mercury and hydrocarbon contaminants, is then recovered for further processing A key aspect of the process of the current invention involves the removal of substantial amounts of the targeted remaining contaminants from the partially-cleaned wastewater stream. Controlled amounts of (1) oxidizing agent, such as a sodium oxychlorite, (2) ferric ions, usually from a ferric salt such as ferric chloride, and (3) sludge-contracting material (such as a polymer flocculent), are sequentially added, respectively, to the partially-cleaned wastewater stream, with relatively short residence times allowed between additions, in order to recover a product wastewater having acceptable concentrations of contaminants. First, the added oxidizing agent, after sufficient residence time, oxidizes reduced forms of arsenic to the +5 oxidation state, e.g., arsine or other organic arsenic forms (soluble in hydrocarbons) or arsenite (soluble in water) are converted to arsenate (soluble in water), to enhance separation of the arsenic by the subsequently added ferric ions and the sludge-contractor. Second, iron-containing precipitates encompassing arsenic, e.g., ferric arsenate and ferric hydroxide, are formed after sufficient reaction time between ferric ions, the wastewater and such oxidized arsenic components. Third, the addition of sludge-contracting material enhances the consolidation (i.e., volume reduction) of the iron/arsenic-containing precipitates, which are then separated from the partially-cleaned wastewater stream along with the residual hydrocarbons and residual mercury, usually as a floating sludge, to form a cleaned wastewater stream capable of being discharged into the surrounding environment in the form of an environmentally safe or benign liquid.

In a preferred embodiment, arsenic and mercury may be simultaneously removed in a single processing step. After removal of any non-emulsified hydrocarbon particulates from the wastewater, the Oxidation Reduction Potential (ORP) of the pre-treated wastewater stream (primarily due to the addition of the oxidizing agent) is controlled within the range from about +75 mv to about +400 mv to (a) maintain mercury in the elemental form and (b) still oxidize arsenic components from reduced oxidation states, such as −3 or +3, to an oxidation state of +5. Accordingly, the elemental mercury and iron/arsenic-containing precipitates formed as a result of the presence and/or addition of ferric ions can then be simultaneously consolidated with the aid of a sludge-contracting material and separated from the wastewater stream.

Common oil field equipment can be utilized in the process of the invention. For example, a surge tank, a skimmer vessel and/or hydrocyclones can be utilized for removal of hydrocarbon and/or mercury-containing sludge during the pre-treatment of wastewater streams, while an induced gas flotation (IGF) vessel can be employed effectively for hydrocarbon, mercury and/or arsenic removal during treatment of pre-treated or partially-cleaned wastewater streams.

DETAILED DESCRIPTION OF THE INVENTION

The wastewater is usually treated by the process of the current invention in a continuous manner at a flow rate of at least about 100 barrels per day (bpd), but in typical commercial embodiments at a rate of about 1,000 to 200,000 bpd, or even more. The wastewater generally contains at least about 60 ppbw of arsenic (calculated as As), at least about 10 ppbw of mercury (calculated as Hg) as well as total petroleum hydrocarbons (TPH) of above about 40 ppmv to about 15 volume percent. Usually the wastewater treated by the invention contains from above about 60 to about 10,000 ppbw, normally from above about 75 to about 2,500 ppbw, and more often about 100 to about 500 ppbw of As. With respect to mercury, the wastewater ordinarily contains more than about 25 ppbw, and typically in the range from about 25 to about 2,000 ppbw of Hg. In the case of the hydrocarbon concentration in the wastewater, the concentration can be as high as 300,000 ppmv, but ordinarily is less than about 500 ppmv, and often less than 200 ppmv.

Figure 1:
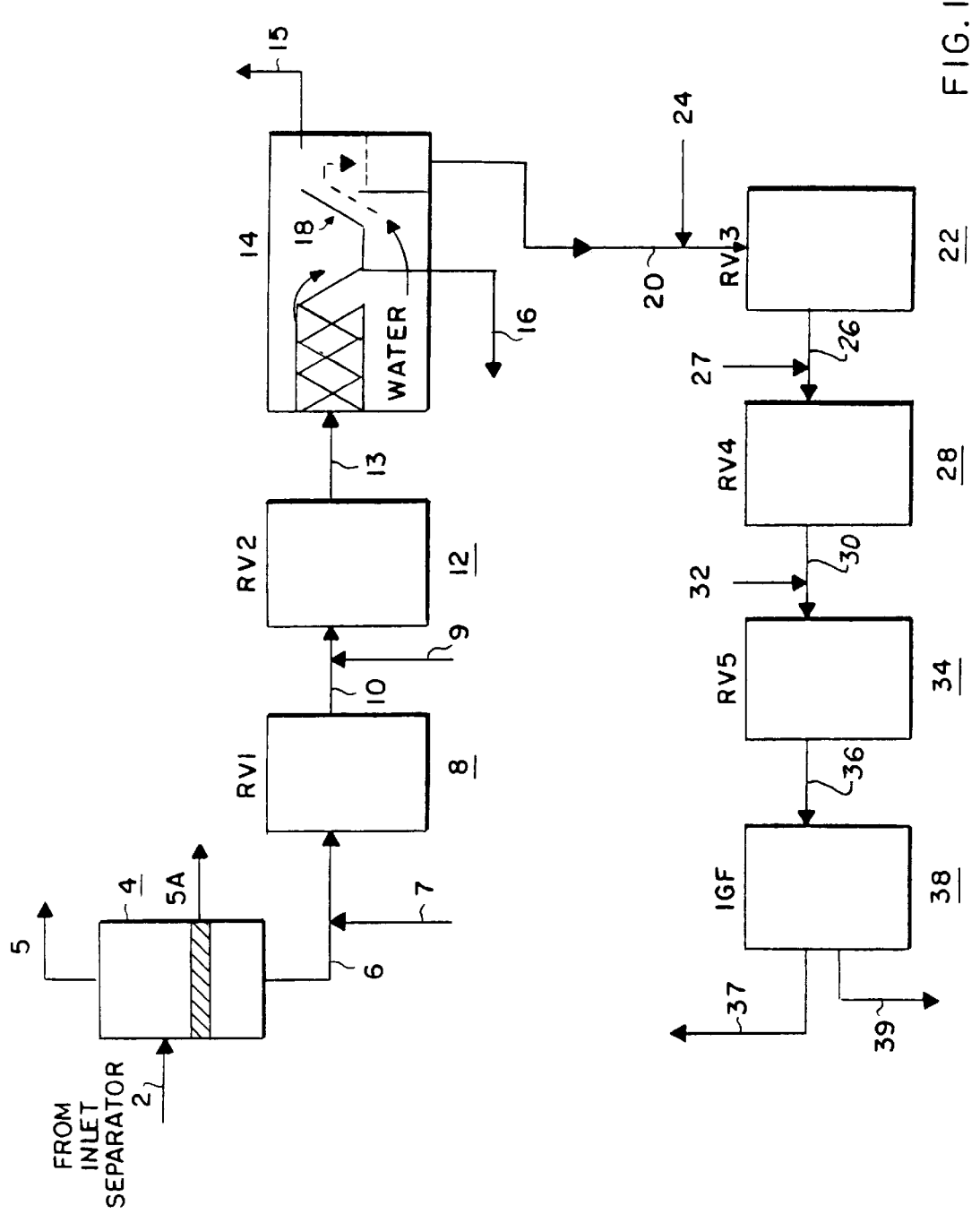
FIG. 1 shows a schematic of a process for removing hydrocarbons, mercury and arsenic from wastewater using a surge vessel, a skimmer vessel, retention vessels and an IGF vessel.

In FIG. 1, wastewater derived from oil field production methods is first introduced through line 2 from an inlet separator into a surge tank 4 wherein the water is at least partially degassed (with gas released through conduit 5) and the bulk free hydrocarbons, i.e., non-emulsified hydrocarbons, are collected and removed through conduit 5A. Such pre-treated wastewater is then passed from the surge tank 4 via lines 6 and 10 serially through two retention vessels 8 and 12, respectively (i.e., RV1 and RV2), that function to provide sufficient residence time for treatment of the water with added chemicals prior to collection of hydrocarbons and the contaminant-containing reaction products in the skimmer vessel 14.

A water clarifier is added to the pre-treated wastewater immediately upstream of or within RV1. Suitable water clarifiers, such as those containing aluminum chloride ($AlCl_3$), ferric chloride ($FeCl_3$), anionic or cationic polymers or other water clarifiers known to those skilled in the art, are normally added (through conduit 7) to the pre-treated wastewater stream depleted of non-emulsified hydrocarbons (in line 6) to destabilize the residual, emulsified hydrocarbon droplets to form non-emulsified hydrocarbons. An economical and convenient water clarifier contains a source of ferric ions, such as ferric chloride, since ferric ions are required in other downstream steps of the invention to aid in the removal of arsenic contaminant components. The practice of the invention requires that one or more water clarifiers be selected and applied in such a manner that they enhance the association of wastewater contaminants such as mercury-containing particulates, particularly elemental mercury, with the residual, emulsified hydrocarbon droplets for eventual separation from water, i.e., that the hydrophobicity of the mercury-containing entities should be maintained or enhanced. Note that any organic or organically soluble mercury forms will be automatically removed from the wastewater stream as the hydrocarbon content of the produced water is reduced.

The dimensions of RV1 are sufficient to provide about 10 to about 900 seconds of residence time to the pre-treated wastewater after chemical addition at the designed flow rate for the process. Water containing the destabilized, previously emulsified hydrocarbons and hydrophobic elemental mercury contaminants is removed from RV1 via conduit 10 and then treated with a suitable sludge-contracting material, such as a flocculent, more particularly, a polymer-containing flocculent, introduced through conduit 9 before or during entry of the water into RV2.

Any suitable technology known to those skilled in the art of wastewater and oilfield produced water cleaning may be used for consolidating contaminant phases in RV2 into a material which is easily retained such as in the disclosed skimmer vessel 14. In some cases, the contaminants will be retained within the skimmer vessel 14 in the form of a sludge which requires further processing and consolidation prior to disposal. In other cases, the contaminants will be held within a floating oil layer in the skimmer vessel which can be removed and combined with other produced liquid hydrocarbons for shipment from the oil production facility. Suitable sludge processing equipment may include centrifuges, hydrocyclones, CPI separators, skim tanks, filters, filter presses, and the like. Suitable sludge-contracting materials include high molecular weight polymer flocculents, commercial compositions of which are known to those skilled in the art. Examples include cationic and anionic polymers such as acrylamide/acrylate polymers, acrylamide modified terpolymers and acrylic polymers. A resulting, partially-cleaned wastewater stream, containing arsenic, mercury, and residual hydrocarbon contaminants, but devoid of a substantial amount of both the original wastewater hydrocarbons and elemental mercury, is separated from the contaminants retained in the skimmer vessel for further processing.

For instance, after exiting RV2, the wastewater containing the mercury/hydrocarbon laden phases is introduced through conduit 13 into a separation means such as a three phase skimmer vessel 14, wherein excess dissolved gas, hydrocarbon contaminants, and mercury contaminants are recovered as either a skimmable hydrocarbon layer or as a floating sludge layer. The excess gas exits the skimmer vessel through conduit 15, while the skimmed hydrocarbon and elemental mercury contaminants exit the skimmer vessel by overflowing into a recovery system represented herein by an oil bucket 18 and are collected via conduit 16. At the same time the partially-cleaned wastewater underflows the bucket, exits the skimmer vessel through conduit 20, and passes to a third retention vessel 22 ( i.e., RV3).

Immediately prior to or within RV3, an oxidant (i.e., oxidizing agent) is added to the partially-cleaned wastewater through conduit 24. The partially-cleaned water stream, devoid of free hydrocarbons, is normally treated with a suitable oxidizing agent in order to oxidize reduced forms of arsenic having oxidation states less than +5, such as oil-soluble arsine (oxidation state of −3) or its water-soluble hydrolyzed form, arsenite (oxidation state of +3), to arsenic compounds having an oxidation state of +5, e.g., arsenates (normally water-soluble). Although a portion of the arsenic contaminants may be in an inorganic form that is highly water soluble, efficient arsenic removal can be accomplished by converting at least some organically-bound arsenic components into a form which is more soluble in aqueous media than in the oil-derived hydrocarbons.

Such conversion of these arsenic forms results from the treatment of the wastewater with any oxidizing agent that reacts with the reduced arsenic compounds to form oxidized arsenic compounds. These oxidized arsenic compounds are more easily precipitated from water, particularly those oxidized arsenic compounds that precipitate in the presence of ferric ions and water. Oxidizing agents contemplated for use herein include oxygen-containing inorganic compounds of Group IA, Group IIA, Group IVA, Group IVB, Group VA, Group VB, Group VIA, Group VIB, Group VIIA and Group VIIB of the Periodic Table. Such oxygen-containing compounds include oxides, peroxides and mixed oxides, including oxyhalites. Examples of such oxidizing agents include vanadium oxytrichloride, chromium oxide, potassium chromate, potassium dichromate, magnesium perchlorate, potassium peroxysulfate, potassium peroxydisulfate, potassium oxychlorite, elemental halogens such as chlorine, bromine, iodine, chlorine dioxide, sodium hypochlorite, calcium permanganate, potassium permanganate, sodium permanganate, ammonium persulfate, sodium persulfate, potassium percarbonate, sodium perborate, potassium periodate, ozone, sodium peroxide, calcium peroxide, and hydrogen peroxide. Also contemplated are organic oxidizing agents such as benzoyl peroxide. Typical oxidizing agents for use herein are contained in compounds providing oxidation-reduction couples (1 molal solution at 25° C. and 1 atmosphere) in acidic aqueous solutions having an E° value greater than +0.56 volts and in basic aqueous solutions having an E° value greater than −0.67 volts. Examples of couples are disclosed on pages 342–345 and 347–348 of *The Oxidation States of the Elements and Their Potentials in Aqueous Solutions*, second edition, authored by Wendell A. Latimer, and published by Prentice Hall, Inc. (1952), the disclosure of which is incorporated by reference in its entirety herein. More highly preferred oxidizing agents are oxyhalites such as the alkali, ammonium and alkaline-earth hypochlorites including KOCl, $NH_4$ OCl and NaOCl, peroxides, $ClO_2$, and ozone—$O_3$.

A sufficient amount of oxidizing agent is added to increase the Oxidation Reduction Potential of the partially-cleaned wastewater introduced into RV3 to at least +75 mv, and preferably from +100 mv to +385 mv, with a highly preferred range from +150 to +300 mv. Increasing the ORP above +440 mv, and even above +400 mv, is usually unnecessary, and can hinder the subsequent removal of residual mercury and/or arsenic from the wastewater. Although the added amount of oxidizing agent is dependent upon the compositions of the wastewater and oxidizing agent, normally about 2 to about 50 ppmw of oxidizing agent is introduced into the wastewater, the pre-treated wastewater or the partially-cleaned wastewater.

After permitting sufficient time for the oxidant to be in contact and react with the components of the wastewater to increase the value of the ORP, typically from about 5 to about 300 seconds, and preferably less than 60 seconds, e.g., about 30 to about 60 seconds, the wastewater is passed to a retention vessel wherein ferric ions can contact and react with the oxidized arsenic components. A residence time of less than about 5 minutes ( preferably about 30 to about 60 seconds) after addition of oxidant and/or after the subsequent contact of femecions with the wastewater, allows the overall process flow rate to be expedited, thus achieving relatively high wastewater throughputs for the inventive process.

Ferric ions, from a source such as ferric chloride, are usually added through conduit 27 to the wastewater in conduit 26 before or during the subsequent introduction of the oxidantcontaining wastewater exiting RV3 into a fourth retention vessel 28, (i.e., RV4) which allows the interaction of ferric ions and arsenic in the +5 oxidation state. Any suitable source of ferric ions is acceptable for introduction into RV4 or for contact with the wastewater in RV4, and particularly water-soluble ferric ion sources. Examples of ferric ion sources include ferric chloride, ferric sulfate, or even the wastewater itself, wherein the added oxidant can oxidize indigenous dissolved ferrous ion ($Fe^{++}$) to the ferric ($Fe^{+++}$) oxidation state. As in the case of added oxidant, a sufficient residence time from about 5 to about 300 seconds is allowed for contact and reaction between the ferric ions and the oxidized arsenic components in order to form iron-containing precipitates (including floccules), such as ferric hydroxide (preferably as a floc) and ferric arsenate components. The formation of significant amounts of ferric hydroxide is necessary due to its role of entrapping the contaminant-containing ferric arsenate. The ferric ions are normally introduced into or contained in the wastewater in RV4, and usually in RV1, in a concentration of at least about 2 to about 100 ppmw, preferably from about 3 to about 25 ppmw, and most preferably from about 5 to about 15 ppmw. It has been discovered that more effective arsenic removal from the wastewater results when the concentration of ferric ions (as detected in the cleaned water for disposal from, for instance, an IGF vessel) decreases during arsenic removal by at least a minimum amount, usually at least about 3 ppmw, and preferably at least about 5 ppmw (calculated as Fe). However, a decrease of more than 20 ppmw, and usually more than about 15 ppmw of ferric ions does not result in increased arsenic reduction in the process of the invention.

The water containing the ferric ions, oxidant and such precipitates is passed from RV4 through conduit 30 and can be treated with a suitable sludge-contracting material, such as a polymer-containing flocculent introduced through conduit 32 either immediately before or within a fifth retention vessel 34 (i.e., RV5) wherein growth and maturation of sludge particles (including floc, floccule, precipitate, and the like) occurs. After the ferric hydroxide/ferric arsenate precipitates have initially formed in RV4 and matured to a suitable size and density in RV5, a properly selected sludge-contracting material may again be added to the wastewater in order to further collect, consolidate, partially dewater and render a hydrophobic character to the sludge. Polymeric flocculents known to those skilled in the art can be selected from polymers, particularly anionic and/or cationic polymers, including the sludge-contracting materials disclosed hereinbefore. The concentrations of sludge-contracting materials added to the wastewater in RV2 and/or RV5 for effective contaminant removal is usually about 1 to about 50 ppmw, preferably about 2 to about 13 ppmw, and more preferably about 2 to about 8 ppmw. The properties imparted to the ferric hydroxide/ferric arsenate-containing precipitates or flocs due to the addition of the sludge-contracting material normally beneficially reduce the volume of the sludge and allow the efficient disposal thereof. In a similar manner as in RV2 relative to the enhancement of the hydrophobicity of the mercury-containing entities, the sludge-contracting material in RV5 is capable of coagulating the ferric hydroxide precipitate (which entraps the ferric arsenate precipitate) to enhance the hydrophobicity of the precipitates.

In a subsequent step, the wastewater containing sludge is removed from RV5 through conduit 36 and introduced into, for example, an induced gas flotation vessel 38 (i.e., IGF) where the floc or sludge containing ferric hydroxide, ferric arsenate, previously unremoved hydrocarbons and residual mercury (normally elemental mercury) is collected through line 39 for suitable disposal. The cleaned wastewater exiting the IGF via conduit 37 is environmentally innocuous and may be disposed by overboard discharge, deep well injection or other acceptable disposal methods. It should be noted that once the collected, consolidated, partially dewatered hydrophobic precipitate or floc is well formed, it can be separated from the wastewater by any suitable process known to those skilled in the art. For example, froth flotation, hydrocyclones, filtration, centrifuging, and the like, are acceptable for purposes of practicing the invention.

A preferred embodiment of the process of the invention involves the simultaneous recovery of arsenic and mercury in a single process step. In this embodiment, the pre-removal of free (non-emulsified) hydrocarbons is still necessary. However, the initial addition of water clarifiers and/or sludge-contracting materials or flocculents to recover mercury (particularly elemental mercury) from the pre-treated wastewater is not necessarily practiced. Following the removal of free (non-emulsified) hydrocarbons, the oxidant is added to the pre-treated water. In this embodiment of the invention, the ORP of the water is carefully controlled to maintain the mercury contaminants in the wastewater in the elemental mercury form. This usually requires an ORP between about +100 mv and +385 mv. If the ORP exceeds about +385 mv, elemental mercury is often converted to cationic mercury forms, such as Hg + and Hg++, and the extraction of contaminant mercury from the wastewater will be seriously degraded in the overall process.

Figure 2:
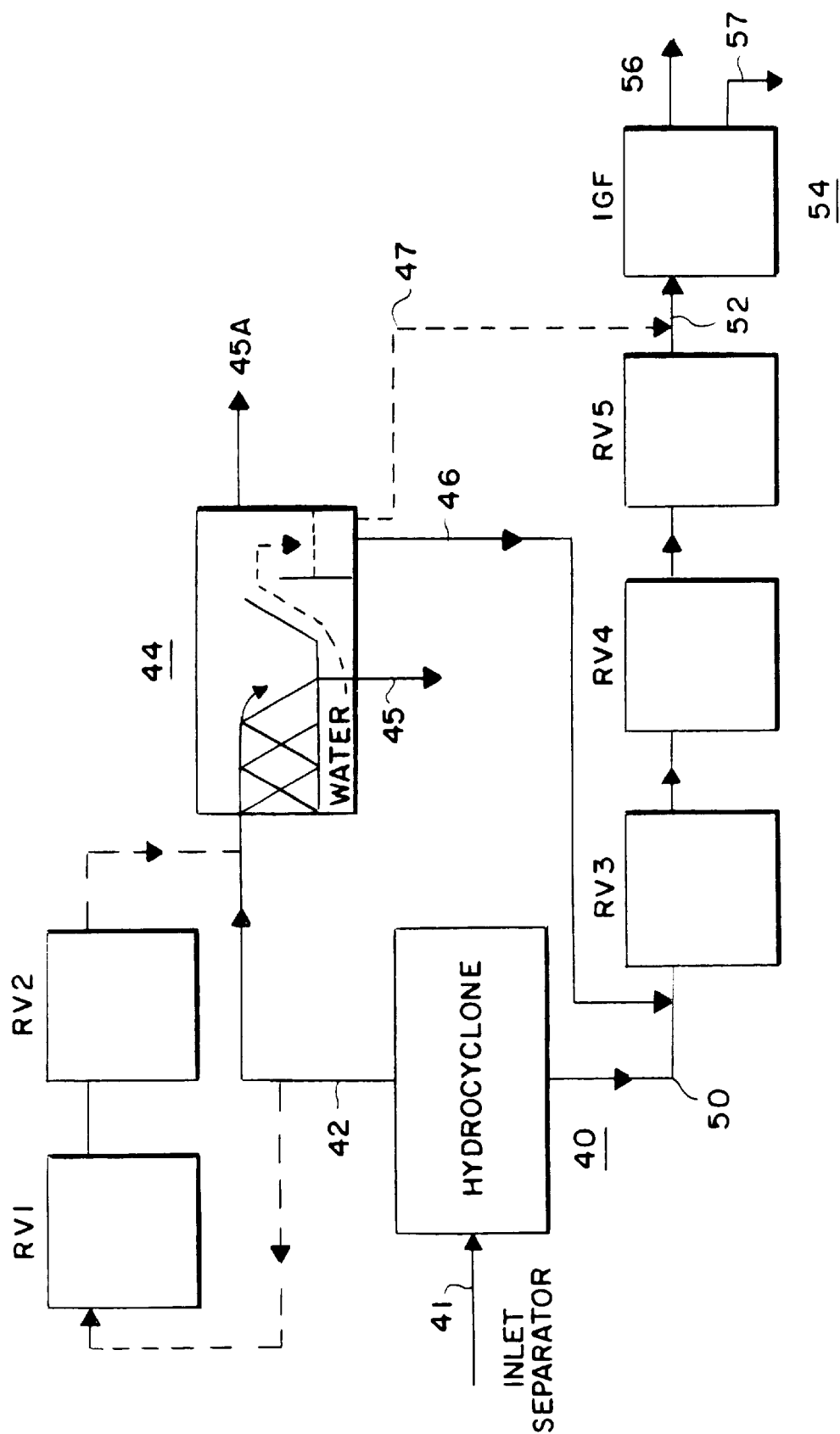
FIG. 2 shows a schematic of a preferred process for lowering the concentrations of hydrocarbons, mercury and arsenic in wastewater by using a hydrocyclone, skimmer vessel, retention vessels and an IGF vessel.

In FIG. 2, the wastewater contaminated with hydrocarbons, mercury and arsenic is passed from an oil/water/gas separator in the production process through line 41 to a hydrocyclone 40 in order to remove free or non-emulsified hydrocarbons and any hydrophobic mercury either soluble or entrapped in the free hydrocarbons. A reject stream, i.e., a hydrocarbon-rich wastewater stream exiting the top of the hydrocyclone, is routed via conduit 42 to a three phase skimmer vessel 44 where free hydrocarbons and any entrapped or organically soluble contaminants are separated and recovered (usually skimmed) through conduit 45 (and gases through 45A). Optionally, chemical treatment of the reject stream 42 in the manner previously described for mercury and emulsified hydrocarbon removal in RV1 and RV2 in FIG. 1 may be practiced upstream of the three phase skim vessel 44.

Underflow pre-treated wastewater from the bottom of hydrocyclone 40, devoid of free or non-emulsified hydrocarbons, is passed through conduit 50 and thereafter treated with oxidant, ferric ions, and flocculent or other sludge-contracting material, in a process similar or identical to the process employed within RV3, RV4, and RV5 in FIG. 1. (Also, in the optional treatment of the hydrocyclone reject stream in conduit 42, the retention vessel(s) RV1 and RV2 of FIG. 1 provide the residence times required between the serial addition of the water clarifier and sludge-contracting material, and the product wastewater may be passed directly to an IGF vessel through conduit 47 or combined with the pre-treated wastewater in conduit 50.)

The wastewater removed from the three-phase skimmer vessel 44 through conduit 46 is combined with the underflow wastewater stream exiting hydrocyclone 40, and the combined stream is in conduit 50 treated for the removal of residual hydrocarbons, residual mercury, and arsenic upstream and/or within RV3, RV4 and RV5 in the manner previously described. The ORP of the combined pre-treated wastewater streams is normally maintained below +400 mv, and preferably below +385 mv, by the addition of the oxidizing agent prior to or within RV3. After formation and contraction of the contaminant-laden sludge obtained from RV5 through conduit 52, the wastewater stream is introduced into an IGF vessel 54 where final contaminant recovery is effected, with hydrocarbons, arsenic and mercury being removed through conduit 57. A cleaned, environmentally innocuous water is then discharged from the process through conduit 56 and is removed from the oil production area, as for instance, from an off-shore oil-producing platform by overboard discharge, deep well injection, or other suitable means.

Particularly in the embodiment of the scheme of FIG. 2, but also appropriate for the scheme of FIG. 1, the ratio of ferric ions to sludge-contracting material may be controlled to achieve more effective arsenic removal. Although the chemistries of the sludge-contracting materials and the wastewater compositions may vary from operation to operation, the ferric ions/sludge-contracting material weight ratio is ordinarily in the range from about 1 to about 10, and preferably at least 1.5, and most preferably above about 2 to less than about 8, or even less than about 7.5. Due to solubility limitations of the oxidized arsenic components contained in the wastewater (e.g., arsenates), it is preferred that at least 5 ppmw of ferric ion be lost in the overall process to achieve maximum arsenic removal.

Common oil field equipment can be utilized in the process of the invention. For example, separator, surge, and skimmer vessels as well as hydrocyclones or other well known oil field equipment suitable for this process can be utilized for the treatment of the originally produced wastewater and pre-treated wastewater streams to recover free hydrocarbons or the combination of hydrocarbon and mercury contaminants. An induced gas flotation (IGF) vessel and other functionally equivalent vessels are examples of processing equipment that can be employed effectively for removal of sludge containing arsenic, mercury and hydrocarbons from the pre-treated and/or partially-cleaned wastewater stream. Furthermore, although the retention vessels and sludge separating equipment have been disclosed for use herein in separate processing steps, it is contemplated that steps be added or combined to the process in other modes of operation known to those skilled in the art—depending upon the particular wastewater compositions, chemical additives available, waste disposal environments, target contaminant levels, and the like.

The invention is further described by the following examples which are illustrative of specific modes of practicing the invention and are not intended as limiting the scope of the invention as defined by the appended claims.

EXAMPLE 1

A wastewater having an initial ORP of −295 mv, an initial inlet contaminant concentration including 748 parts per million by weight (ppmw) of total petroleum hydrocarbons (TPH), 40 parts per billion by weight (ppbw) of mercury, calculated as Hg, and 105 to 134 ppbw of arsenic, calculated as As, is processed through the scheme of FIG. 1 herein at a flow rate of about 256 barrels of water per day (i.e. 7.5 gallons per minute) on a continuous basis.

In one pilot run, the water is contacted and mixed with 5.8 ppmv of ferric ion prior to RV1 (via conduit 7), with 2.8 ppmv of a sludge-contracting material containing flocculent prior to RV2 (via conduit 9), with 5.3 ppmv of an oxidizing agent containing sodium hypochlorite prior to RV3 (via conduit 24) providing an ORP of +125 mv, with 21 ppmw of ferric ion prior to RV4 (via conduit 27), and with 4.8 ppmv of additional sludge-contracting material, including flocculent prior to RV5 (via conduit 32).

The partially-cleaned wastewater exiting the skim tank in conduit 20 contains 22 ppmw of hydrocarbons, 4.8 ppbw of Hg and 112 ppbw of As. The concentration of remaining contaminants in the partially-cleaned wastewater stream indicates that arsenic is not substantially removed from the wastewater stream by the addition of ferric ion alone.

Water exiting the IGF vessel 38 contains 19 ppmw of hydrocarbons, 1.0 ppbw of Hg, and 48 ppbw of As. This cleaned wastewater, treated with both the oxidizing agent and ferric ion prior to entry into the IGF vessel, has an arsenic concentration substantially lower than the arsenic concentration in the original wastewater or the pre-treated wastewater streams. This cleaned wastewater meets the criteria for disposal for the geographical area in which it was produced, i.e., the Gulf of Thailand, during off-shore production of oil, natural gas and condensate. (An acceptable criteria for disposal in the Gulf of Thailand is:

TPH<40 ppmw, Hg<10 ppbw, and As<100 ppbw.)

In another pilot run under the same conditions as the first, the concentration of the oxidizing agent, NaOCl, (in RV3) is decreased to 3.8 ppmw providing an ORP of −20 mv, the concentration of ferric ion (in RV4) is decreased to 5.9 ppmw, and the flocculent (in RV5) is increased to 6.6 ppmv. During this run, the cleaned water exiting the IGF vessel contained 11 ppmw of hydrocarbons, 2.2 ppbw of Hg, and 114 ppbw of As. In this run, the concentration of hydrocarbons and Hg in the cleaned wastewater reflects essentially the same reduction compared to that in the first run. However, the arsenic concentration reflects little arsenic reduction by the process, thus illustrating that sufficient amounts of the oxidant must be added to achieve the desired arsenic reduction.

Runs 3 through 6 are conducted in a similar manner as the first run, except ferric ion is injected at a concentration of 14.2 ppmw and 16 ppmw in RV1 and RV4, respectively, and the flocculent injected in RV5 is 5 ppmv. The concentrations of the oxidizing agent in RV3 are varied from zero to 18 ppmw in runs 3 through 6 and changes in the ORP of the wastewater and the reductions of Hg and As are summarized in Table 1.

The data in Table 1 indicate, for instance, that in run 4, an ORP of −135 mv (versus an ORP for untreated water of −295 mv in run 3) is below the value required to significantly reduce the arsenic concentration, whereas the addition of sufficient oxidant to the wastewater to generate an ORP of +270 mv in run 5 allows the inventive process to reduce As in the water to 63 ppbw, i.e., a reduction of As of over 40 percent, and still reduce the Hg by over 75 percent. Runs 3 through 5 all exhibit Hg reduction well over 50 percent when little or moderate amounts of oxidant are added to the wastewater and the ORP is kept below about 400 mv. However, in run 6, where the ORP of the wastewater is increased by oxidant addition to +449 mv, the water exiting the IGF vessel contains approximately the same concentration of Hg as the water entering the IGF. Such data illustrate a requirement of the inventive process to restrict oxidant addition to the wastewater so as to maintain the ORP level below that necessary to remove both As and Hg simultaneously in the IGF. Ordinarily the ORP level must be kept below about 400 mv to prevent substantial oxidation of elemental Hg to Hg+ or Hg++ cations—which are not significantly removed by the process.

EXAMPLE 2

A wastewater is processed through a hydrocyclone in the scheme illustrated in FIG. 2 (without the optional processing through RV1 and RV2), at a continuous rate of 250 barrels per day. The wastewater contains 309 ppmw of hydrocarbons, 22 ppbw of Hg, and 74 to 125 ppbw of As. The Hg and As contaminants are simultaneously removed from the underflow wastewater which exits the hydrocyclone through conduit 50. Data are summarized in Table 2.

TABLE 1

| Run No. | NaOCl (ppmw Cl) | ORP (mv) | Mercury | | | Arsenic | | |
|---|---|---|---|---|---|---|---|---|
| | | | IGF Inlet (ppbw) | IGF Outlet (ppbw) | Reduction | IGF Inlet (ppbw) | IGF Outlet (ppmw) | Reduction |
| 3 | 0 | −295 | 3.0 | 0.2 | 93% | 104 | 101 | 3% |
| 4 | 1.8 | −135 | 4.7 | 1.3 | 72% | 102 | 101 | 1% |
| 5 | 6.4 | 270 | 2.7 | 0.6 | 78% | 110 | 63 | 43% |
| 6 | 18 | 449 | 4.3 | 5.1 | 0% | 112 | 66 | 41% |

TABLE 2

| Run No. | RV3 NaOCl, ppmw | RV3 ORP, mv | RV4 Ferric Ion, ppmw | RV5 Polymer, ppmw | | Contaminant Concentrations Hydrocyclone Outlet (Prior to RV3) | IGF Discharge |
|---|---|---|---|---|---|---|---|
| 7 | 0 | −295 | 15 | 6.3 | TPH (ppmw) | 62 | 13 |
|   |   |   |   |   | Hg (ppbw) | 8.4 | 6.3 |
|   |   |   |   |   | As(ppbw) | 118 | 125 |
| 8 | 0 | −295 | 19 | 3.3 | TPH(ppmw) |  | 16 |
|   |   |   |   |   | Hg(ppbw) |  | 2.6 |
|   |   |   |   |   | As(ppbw) |  | 94 |
| 9 | 0 | −295 | 9.3 | 6.3 | TPH (ppmw) |  | 13 |
|   |   |   |   |   | Hg(ppbw) |  | 1.6 |
|   |   |   |   |   | As(ppbw) |  | 79 |
| 10 | 0 | −295 | 6.8 | 3.3 | TPH(ppmw) |  | 10 |
|   |   |   |   |   | Hg(ppbw) |  | 0.6 |
|   |   |   |   |   | As(ppbw) |  | 74 |
| 11 | 15.3 | +270 | 15 | 6.3 | TPH(ppmw) | 76 | 11 |
|   |   |   |   |   | Hg(ppbw) | 9.2 | 0.3 |
|   |   |   |   |   | As(ppbw) | 116 | 48 |
| 12 | 15.3 | +270 | 15 | 3.3 | TPH(ppmw) |  | 14 |
|   |   |   |   |   | Hg(ppbw) |  | 2.8 |
|   |   |   |   |   | As(ppbw) |  | 52 |
| 13 | 15.3 | +270 | 9.3 | 6.3 | TPH(ppmw) |  | 15 |
|   |   |   |   |   | Hg(ppbw) |  | 4.3 |
|   |   |   |   |   | As(ppbw) |  | 50 |
| 14 | 15.3 | +270 | 6.8 | 3.3 | TPH(ppmw) |  | 14 |
|   |   |   |   |   | Hg(ppbw) |  | 2.8 |
|   |   |   |   |   | As(ppbw) |  | 52 |

Oxidant, NaOCl, is added in runs 11 through 14 prior to the introduction of the wastewater into RV3 to generate an ORP of +270 mv and ferric ion is added in runs 7 through 14 prior to RV4 while the flocculent is added prior to RV5.

Although the hydrocarbon and Hg concentrations exiting the hydrocyclone are substantially reduced compared to the original wastewater, As concentrations are not substantially reduced until after discharge of the cleaned water from the IGF vessel and only in runs 11 through 14 where the ORP is increased to +270 mv due to oxidant addition (i.e., As is reduced to 48–52 ppbw in runs 11–14). The ORP is sufficiently high in value in runs 11 through 14 to allow the simultaneous substantial reduction in the Hg concentration (i.e., at least 50 percent and as high as 96 percent reduction). Furthermore, the hydrocarbon concentrations are also reduced in inventive runs 11 through 14 by at least about 80 percent).

EXAMPLE 3

A wastewater having an ORP of −295 mv and an initial inlet concentration including 297 parts per million by weight (ppmw) of total petroleum hydrocarbons (TPH), 36 parts per billion by weight (ppbw) of mercury, calculated as Hg, and 429 ppbw of arsenic, calculated as As, is processed through the scheme of FIG. 1 herein at a flow rate of about 256 barrels of water per day (i.e. 7.5 gallons per minute) on a continuous basis.

In a fifteenth pilot run, the waste water is contacted and mixed with 15 ppmw of ferric ion prior to RV1 (via conduit 7), with 5 ppmv of a sludge-contracting material containing flocculent prior to RV2 (via conduit 9), with sufficient oxidizing agent containing sodium oxychloride prior to RV3 (via conduit 24) to provide an ORP of +300 mv, with 15 ppmw of ferric ion prior to RV4 (via conduit 27), and with 5 ppmv of additional sludge-contracting material, including flocculent, prior to RV5 (via conduit 32).

Water exiting the IGF vessel 38 contains 16 ppmw of hydrocarbons, 3.8 ppbw of Hg, and 57 ppbw of As. This cleaned wastewater has an arsenic, mercury and hydrocarbon concentration substantially lower than the arsenic concentration in the original wastewater stream, i.e., at least an 85 percent reduction. This cleaned wastewater meets the criteria for disposal for the Gulf of Thailand, during offshore production of oil, natural gas and condensate.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

We claim:

1. A process for removing hydrocarbons, arsenic and mercury from a feed wastewater, said process comprising:
   (a) contacting said feed wastewater with an oxidizing agent to oxidize said arsenic contained in said feed wastewater from an oxidation state of less than +5 to an oxidation state of +5 to form oxidized arsenic and to raise the Oxidation Reduction Potential of said feed wastewater to a value below +400 mv;
   (b) contacting the wastewater from step (a) containing said oxidized arsenic with ferric ions for a sufficient time to form precipitates containing iron and said oxidized arsenic, respectively;
   (c) adding a sludge-contracting material to the wastewater of step (b) to consolidate said precipitates and form a sludge containing at least a portion of said oxidized arsenic, at least a portion of said mercury and at least a portion of said hydrocarbons; and
   (d) separating said sludge from the wastewater of step (c) to form a cleaned wastewater having a reduced concentration of hydrocarbons, arsenic, and mercury as compared to said feed wastewater.

2. The process defined in claim 1 wherein said Oxidation Reduction Potential of said feed wastewater is raised to a value above +75 mv in step (a).

3. The process defined in claim 2 wherein at least a portion of said hydrocarbons are separated from said feed wastewater prior to step (a).

4. The process defined in claim 3 wherein at least a portion of said mercury is removed from said feed wastewater in the elemental form prior to step (a).

5. The process defined in claim 3 wherein said mercury is present in said feed wastewater in the elemental form prior to step (a) and said precipitates comprise ferric hydroxide and ferric arsenate, respectively.

6. The process defined in claim 3 wherein said sludge-contracting material comprises a polymer flocculent.

7. The process defined in claim 3 wherein said Oxidation Reduction Potential of said feed wastewater is raised to a value in the range from about +100 mv to below +400 mv in step (a).

8. The process defined in claim 3 wherein said oxidizing agent is in contact with said feed wastewater in step (a) for about 5 to about 60 seconds prior to step (b).

9. The process defined in claim 3 wherein the concentration of arsenic in said cleaned wastewater is less than about 250 ppbw, calculated as As.

10. The process defined in claim 3 wherein the concentration of arsenic in said cleaned wastewater is less than about 100 ppbw, calculated as As.

11. The process defined in claim 3 wherein the concentration of mercury in said cleaned wastewater is less than about 10 ppbw, calculated as Hg.

12. The process defined in claim 11 wherein the concentration of mercury in said cleaned wastewater is less than about 5 ppbw, calculated as Hg.

13. The process defined in claim 3 wherein said Oxidation Reduction Potential of said feed wastewater is raised to a value in the range from about +150 mv to about +385 mv in step (a).

14. The process defined in claim 3 wherein said sludge is separated from the wastewater of step (c) by froth flotation.

15. The process defined in claim 14 wherein at least a portion of said hydrocarbons are separated from said feed wastewater in a hydrocyclone.

16. The process defined in claim 3 wherein the source of said ferric ions is ferric chloride.

17. The process defined in claim 3 wherein the concentration of total petroleum hydrocarbons in said cleaned wastewater is less than about 40 ppmw.

18. The process defined in claim 3 comprising the further step of converting any mercury in said feed wastewater that is not in the elemental form into the elemental form prior to step (a).

19. The process defined in claim 18 where said conversion is carried out by adding a reducing agent to said feed wastewater to reduce the non-elemental mercury to elemental mercury.

20. The process defined in claim 3 wherein the mercury in said sludge is in the elemental form.

21. The process defined in claim 3 wherein said Oxidation Reduction Potential of said feed wastewater is raised to a value in the range from about +75 to about +150 mv in step (a).

22. The process defined in claim 2 wherein said hydrocarbons in said feed wastewater comprise non-emulsified and emulsified hydrocarbons and said non-emulsified hydrocarbons are removed from said feed wastewater prior to step (a).

23. The process defined in claim 22 further comprising the step of destabilizing said emulsified hydrocarbons to form destabilized non-emulsified hydrocarbons and removing at least a portion of said destabilized non-emulsified hydrocarbons from said feed wastewater prior to step (a).

24. The process defined in claim 23 wherein said destabilized non-emulsified hydrocarbons and said mercury are simultaneously removed from said wastewater.

25. The process defined in claim 22 wherein said non-emulsified hydrocarbons are removed from said wastewater in a hydrocyclone.

26. The process defined in claim 22 wherein the wastewater from step (a) contains emulsified hydrocarbons, and at least a portion of said emulsified hydrocarbons are destabilized in step (b) by said ferric ions to form destabilized non-emulsified hydrocarbons.

27. A process for removing emulsified and non-emulsified hydrocarbons, mercury and arsenic from a feed wastewater, said process comprising:

(a) removing at least a portion of said non-emulsified hydrocarbons from said feed wastewater to form a pre-treated wastewater containing emulsified hydrocarbons, mercury and arsenic;

(b) destabilizing at least a portion of said emulsified hydrocarbons to form destabilized non-emulsified hydrocarbons in said pre-treated wastewater;

(c) separating at least a portion of said destabilized non-emulsified hydrocarbons and at least a portion of said mercury from said pre-treated wastewater to form a partially-cleaned wastewater containing residual hydrocarbons, residual mercury and arsenic;

(d) contacting said partially-cleaned wastewater with an oxidizing agent so as to convert said arsenic from an oxidation state of less than +5 to an oxidation state of +5;

(e) contacting the wastewater of step (d) with ferric ions to form precipitates containing oxidized arsenic, said residual mercury and said residual hydrocarbons; and (f) separating said precipitates from the effluent of step (e) to form a cleaned wastewater having a reduced concentration of said emulsified and non-emulsified hydrocarbons, said arsenic and said mercury as compared to said feed wastewater.

28. The process defined in claim 27 wherein said oxidizing agent comprises an oxyhalite.

29. The process defined in claim 27 wherein said oxidizing agent comprises sodium oxychlorite.

30. The process defined in claim 27 wherein step (f) is carried out by adding a sludge-contracting material to the wastewater of step (e) to consolidate said precipitates into a sludge and then separating said sludge from the resultant mixture to form said cleaned wastewater.

31. The process defined in claim 30 wherein step (b) is carried out by contacting the wastewater of step (a) with a water clarifier.

32. The process defined in claim 31 wherein said water clarifier comprises aluminum chloride or ferric chloride.

33. The process defined in claim 30 wherein said sludge-contracting material comprises a polymeric flocculent.

34. The process defined in claim 30 wherein said sludge comprises a floating sludge.

35. The process defined in claim 30 wherein the wastewater of step (d) is contacted with said ferric ions in step (e) for about 5 seconds to less than about 900 seconds prior to the addition of said sludge-contracting material in step (f).

36. The process defined in claim 35 wherein said sludge-contracting material is in contact with the wastewater of step (e) for less than about 900 seconds in step (f) prior to formation of said sludge.

37. The process defined in claim 36 wherein said sludge-contracting material is in contact with the wastewater of step (e) for less than about 600 seconds in step (f) prior to formation of said sludge.

38. The process defined in claim 30 wherein said sludge-contracting material is added to the wastewater of step (e) in amounts sufficient to form a weight ratio of said ferric ions to sludge-contracting material from about 2 to about 8.

39. The process defined in claim 27 wherein the source of said ferric ions is ferric chloride.

40. The process defined in claim 27 wherein said mercury is in the form of elemental mercury.

41. The process defined in claim 27 wherein said partially-cleaned wastewater is contacted with said oxidizing agent in step (d) for about 5 seconds to less than about 900 seconds prior to being contacted with said ferric ions in step (e).

42. The process defined in claim 27 wherein the Oxidation-Reduction Potential of said partially-cleaned wastewater in step (d) is controlled in the range from about +75 mv to less than about +400 mv.

43. The process defined in claim 42 wherein said Oxidation-Reduction Potential is controlled in the range from about +150 mv to about +350 mv.

44. The process defined in claim 3 wherein said oxidizing agent comprises sodium hypochlorite.

45. A process for removing hydrocarbons, mercury and arsenic from a feed wastewater, said process comprising:
   (a) separating said feed wastewater into a first wastewater stream containing non-emulsified hydrocarbons and a pre-treated wastewater stream containing residual hydrocarbons, arsenic and mercury;
   (b) adding an oxidizing agent to said pre-treated wastewater stream (1) to convert said arsenic from an oxidation state of less than +5 to an oxidation state of +5 to form oxidized arsenic and (2) to raise the Oxidation Reduction Potential of said pre-treated wastewater to a value between about +75 mv and about +400 mv;
   (c) contacting the wastewater from step (b) containing said oxidized arsenic with ferric ions to form a precipitate comprising ferric hydroxide and a precipitate comprising said oxidized arsenic in the form of ferric arsenate;
   (d) contacting the wastewater from step (c) with a sludge-contracting material to form a sludge containing said precipitates, at least a portion of said mercury and at least a portion of said residual hydrocarbons; and
   (e) separating said sludge from the wastewater of step (d) to form a cleaned wastewater having a reduced concentration of residual hydrocarbons, mercury and arsenic as compared to said pre-treated wastewater stream.

46. The process defined in claim 45 wherein said first wastewater stream further comprises a portion of said mercury from said feed wastewater and emulsified hydrocarbons, and said process further comprises the step of destabilizing said emulsified hydrocarbons to form destabilized non-emulsified hydrocarbons.

47. The process defined in claim 46 further comprising the step of separating at least a portion of said destabilized non-emulsified hydrocarbons and at least a portion of said mercury from said first wastewater stream to form a partially-cleaned wastewater stream.

48. The process defined in claim 47 further comprising the step of combining said pre-treated wastewater stream and said partially-cleaned wastewater stream prior to adding said oxidizing agent to said pre-treated wastewater stream.

49. The process defined in claim 46 wherein said Oxidation Reduction Potential is in the range from about +150 mw to about +350 mv.

50. The process defined in claim 45 wherein said non-emulsified hydrocarbons are removed from said first wastewater stream to form a second wastewater stream, and said second wastewater stream is combined with said pre-treated wastewater stream prior to adding said oxidizing agent to said pre-treated wastewater stream.

51. The process defined in claim 45 wherein said feed wastewater is separated into said first wastewater stream and said pre-treated wastewater stream in a hydrocyclone.

52. The process defined in claim 51 wherein said Oxidation Reduction Potential is in the range from about +100 mv to about +400 mv.

53. The process defined in claim 52 wherein said oxidizing agent comprises sodium oxychlorite and said sludge-contracting material comprises a polymer flocculent.

54. The process defined in claim 45 wherein said Oxidation Reduction Potential is in the range from about +75 to about +150 mv.

55. A process for removing emulsified hydrocarbons, non-emulsified hydrocarbons and mercury from a wastewater, which process comprises:
   (a) separating at least a portion of said non-emulsified hydrocarbons from said wastewater to form a partially-cleaned wastewater containing emulsified hydrocarbons and mercury;
   (b) contacting said partially-cleaned wastewater with ferric ions for a sufficient time to form an iron-containing precipitate and to destabilize at least a portion of said emulsified hydrocarbons to form destabilize non-emulsified hydrocarbons;
   (c) adding a sludge-contracting material to the wastewater of step (b) to form a sludge containing said iron-containing precipitate, at least a portion of said mercury, and at least a portion of said destabilize non-emulsified hydrocarbons; and
   (d) separating said sludge from the wastewater of step (c) to form a cleaned wastewater.

56. The process defined in claim 55 wherein said iron-containing precipitate comprises ferric hydroxide.

57. The process defined in claim 55 wherein the Oxidation Reduction Potential of the wastewater in step (b) is maintained below about +400 mv.

58. The process defined in claim 57 wherein the Oxidation Reduction Potential of the wastewater in step (b) is maintained in the range between about +75 and about +150 mv.

59. The process defined in claim 55 wherein the mercury in said sludge is in the elemental form.

* * * * *

UNITED STATES PATENT AND TRADEMARK OFFICE
CERTIFICATE OF CORRECTION

PATENT NO. : 6,117,333
DATED : September 12, 2000
INVENTOR(S) : Theodore C. Frankiewicz et al.

It is certified that error appears in the above-indentified patent and that said Letters Patent is hereby corrected as shown below:

Column 1, line 61, before the period delete "streams".

Column 7, line 57, after "40," and before "and" insert -- in conduit 50 --; line 58, cancel "in conduit 50".

Signed and Sealed this

Twenty-fourth Day of April, 2001

Attest:

NICHOLAS P. GODICI

Attesting Officer

Acting Director of the United States Patent and Trademark Office